United States Patent
Tiliks et al.

(10) Patent No.: US 7,366,292 B2
(45) Date of Patent: Apr. 29, 2008

(54) CALL MANAGEMENT REPORTS

(75) Inventors: Dianna Inara Tiliks, Elk Grove, IL (US); Nancy Ann Book, Naperville, IL (US); Susanne Marie Crockett, Buffalo Grove, IL (US); Carol Shifrin Gruchala, Naperville, IL (US); John Wesley Moss, Lake Zurich, IL (US); Thomas Joseph McBlain, Arlington Heights, IL (US); Gordon Lynn Blumenschein, Woodridge, IL (US); James Daniel Kovarik, Batavia, IL (US); Barbara Jablonski, Niles, IL (US); Douglas Marshall, Round Lake, IL (US); Jayson Anthony O'Neill, Chicago, IL (US); Matthew D. Brooks, San Antonio, TX (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 995 days.

(21) Appl. No.: 09/985,244

(22) Filed: Nov. 2, 2001

(65) Prior Publication Data

US 2003/0086552 A1    May 8, 2003

(51) Int. Cl.
*H04M 7/00* (2006.01)
*H04M 3/00* (2006.01)

(52) U.S. Cl. .................. 379/221.09; 379/221.08; 379/266.01

(58) Field of Classification Search ......... 379/221.08, 379/221.09, 266.1
See application file for complete search history.

(56) References Cited

U.S. PATENT DOCUMENTS

| | | | |
|---|---|---|---|
| 4,464,543 A | | 8/1984 | Kline et al. |
| 5,060,150 A | * | 10/1991 | Simor .................. 719/313 |
| 5,241,586 A | | 8/1993 | Wilson et al. |
| 5,506,893 A | | 4/1996 | Buscher et al. |
| 5,680,446 A | | 10/1997 | Fleischer, III et al. |
| 5,778,057 A | * | 7/1998 | Atai .................. 379/221.08 |
| 5,799,073 A | | 8/1998 | Fleischer, III et al. |
| 5,854,835 A | | 12/1998 | Montgomery et al. |
| 5,896,445 A | * | 4/1999 | Kay et al. .................. 379/135 |
| 6,018,567 A | | 1/2000 | Dulman |
| 6,078,647 A | | 6/2000 | D'Eletto |
| 6,229,887 B1 | | 5/2001 | Albers et al. |
| 6,249,572 B1 | | 6/2001 | Brockman et al. |
| 6,373,934 B2 | * | 4/2002 | Jensen .................. 379/140 |
| 6,650,633 B1 | * | 11/2003 | Albers et al. .......... 370/352 |
| 6,735,290 B1 | * | 5/2004 | Rauba .................. 379/114.16 |
| 6,785,379 B1 | * | 8/2004 | Rogers et al. ........ 379/265.02 |
| 6,804,341 B1 | * | 10/2004 | Contractor .......... 379/207.02 |

* cited by examiner

*Primary Examiner*—Rasha S. Al-Aubaidi
(74) *Attorney, Agent, or Firm*—Greenblum & Bernstein, P.L.C.

(57) ABSTRACT

The present invention relates to a service for providing call reports to a subscriber related to non-answered calls for calls attempted between at least two parties. Using telecommunications switch triggers, call status related to answered, busy, and unanswered calls is collected in a record and used to populate a report. The report is then provided to a report formatter that formats the report so that it is suitable for presentation to a subscriber. The reported call information can be provided to the report formatter in near real time.

18 Claims, 7 Drawing Sheets

JOHN DOE'S CALL MANAGEMENT REPORT
(13 April 2001; 10:00 AM - 07:00 PM)

INCOMING CALLS

Answered Calls

| Calling Number | Name | Time of Call | |
|---|---|---|---|
| (555) 555-5510 | Abby Doe | 10:30 AM | ~ 301 |
| (555) 555-5510 | Alan Doe | 11:00 AM | |
| (555) 555-5510 | Amy Doe | 11:30 AM | |

Unanswered Calls

| Calling Number | Name | Time of Call | |
|---|---|---|---|
| (555) 555-5510 | Bill Doe | 12:00 PM | ~ 302 |
| (555) 555-5510 | Bob Doe | 12:30 PM | |
| (555) 555-5510 | Barry Doe | 01:00 PM | |

Busy Calls

| Calling Number | Name | Time of Call | |
|---|---|---|---|
| (555) 555-5510 | Connie Doe | 01:30 PM | ~ 303 |
| (555) 555-5510 | Calvin Doe | 02:00 PM | |

OUTGOING CALLS

Answered Calls

| Calling Number | Name | Time of Call | |
|---|---|---|---|
| (555) 555-5510 | Dodd Doe | 03:00 PM | ~ 304 |
| (555) 555-5510 | Dillon Doe | 03:30 PM | |
| (555) 555-5510 | Derek Doe | 04:00 PM | |

Unanswered Calls

| Calling Number | Name | Time of Call | |
|---|---|---|---|
| (555) 555-5510 | Erin Doe | 04:30 PM | ~ 305 |
| (555) 555-5510 | Eric Doe | 05:00 PM | |
| (555) 555-5510 | Emily Doe | 05:30 PM | |

Busy Calls

| Calling Number | Name | Time of Call | |
|---|---|---|---|
| (555) 555-5510 | Francis Doe | 06:00 PM | ~ 306 |
| (555) 555-5510 | Fred Doe | 06:30 PM | |

FIG. 10

CALL MANAGEMENT REPORTS

BACKGROUND OF THE INVENTION

1. Field of the Invention

The invention relates to the field of telecommunications. More particularly, the present invention relates to call reporting services that enable subscribers to access incoming and outgoing call information related to completed and not completed calls.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, the acronyms are defined as follows:

Advanced Intelligent Network (AIN)
Call Management Reports (CMR)
Calling Name Delivery (CNAM)
Central Office Exchange Service (CENTREX)
Customized Dialing Plan (CDP)
Direct Inward Dial (DID)
Direct Outward Dial (DOD)
End Office (EO)
File Transfer Protocol (FTP)
Graphical User Interface (GUI)
Generic Data Interface (GDI)
HyperText Mark-Up Language (HTML)
HyperText Transfer Protocol (HTTP)
Initial Address Message (IAM)
Local Area Network (LAN)
Off Hook Delay (OHD)
Personal Computer (PC)
Specific Digit String (SDS)
Service Control Point (SCP)
Service Switching Point (SSP)
Signaling System 7 (SS7)
Signaling Transfer Point (STP)
Terminating Attempt Trigger (TAT)
Transmission Control Protocol/Internet Protocol (TCP/IP)
Wide Area Network (WAN)
World Wide Web (WWW)

3. Background Information

Currently, subscribers to services within the public switched telephone network (PSTN) are able to obtain call reports about completed calls they have placed, but, in the limited form of telephone bills. When a call is placed by an originating caller and is connected to a called party, the telephone company connecting the call collects information about the call and incorporates it into a bill. The bill is sent to a telephone subscriber, typically at the end of a month, so that the subscriber can see details of the calls justifying the telephone company charges. A typical phone bill consists of information related to each call where a connection was established between the subscriber and the called party. This being so, because, telephone companies only charge for connected calls. The related call information for a particular call includes the called party's telephone number, the date and time the call was made, the duration of the call, and the cost of the call.

More recently, telephone customers have, additionally, been able to retrieve electronic versions of their bills in various forms. Some of these electronic versions even allow subscribers to select a number on their bill causing a reverse lookup of the number, thereby, revealing information about the called party. Despite these innovations, however, the call detail in billing information, even in these high-tech billing systems, is limited to providing information about completed calls the caller initiates.

Another use of call reporting information is to provide toll-free "800" service providers with call history and caller billing detail. In a typical "800" service scenario, an originating caller dials an "800" number, or other toll free number, to contact a representative of the organization with the "800" number. The cost of the call, instead of being charged to the caller, is charged to the "800" service subscriber being called. The "800" service provider, in turn, records each call and presents the "800" subscriber with a bill including information about the callers at the end of a billing cycle. This report is used by the "800" subscriber to learn about his client base and to ensure that the "800" service provider has not wrongly charged the "800" subscriber. But these reports, too, are limited to providing call related information about calls that have been actually connected.

A caller ID service attempts to provide additional caller detail to caller ID subscribers. Caller ID is a service that allows a called party to be aware of whom the originating caller is. Typically, the caller's number and other related caller information is presented to a called party by a display on the called party's phone while the phone is ringing. This display enables the called party to determine if he or she should answer the phone. This information, however, is not centrally stored or presented to the caller or called party in any form of consolidated report.

To a calling party, reports including calls not completed can be helpful. For example, a parent may wish to monitor all calls a child places. This information could be helpful to the parent when determining if the child is having a problem or needs help. For an employer, the number of calls that an employee may attempt could be useful in determining employee efficiency. Additionally, an employer could use this information to determine the most opportune time to reach a customer. Unfortunately, such information can not be realized by a subscriber given the current technology where unanswered or busy call information is not reported to the subscriber in a consolidated periodic report.

To a called party, reports including calls not completed can also be helpful. Businesses could greatly benefit if reports were available to them detailing calls that were attempted but not completed. Calls unanswered by a business or calls missed because a phone line was busy could mean lost revenues for a company. With information about potential customers that attempted to call but were unsuccessful, businesses could possibly later reach these missed opportunities. Further, the information regarding the unsuccessful callers could be combined with other information to create profiles about callers in specific regions. Moreover, the information could be used to determine periods where more help is needed to keep up with demand. Unfortunately, however, consolidated periodic reports including call unanswered or busy call information are not available to phone subscribers and such advantages cannot be realized.

Moreover, a disadvantage of today's call reporting systems is that one typically has to wait until the end of the month to access their call information. This is disadvantageous to businesses and individual subscribers since opportunities do not necessarily occur in monthly increments and do not last long. A customer could end up establishing a relationship with another company if the customer is not contacted within a reasonable time.

The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

The present invention relates to call reporting services that resolve the previously identified problems. The call reporting services provide reports to subscribers related to calls that were answered, unanswered, or busy. The present invention is an AIN based system and method that allows a subscriber connected to a communications network, including the Internet, to have access to call reports including information on calls not connected.

In view of the above, the present invention through one or more of its various aspects and/or embodiments is presented to accomplish one or more objectives and advantages, such as those noted below.

In a first embodiment of the invention, a system collects subscriber call information using an SCP that collects, based on a received query generated when an end office switch is triggered, the subscriber's call information. The subscriber's call information includes at least some of the subscriber's incoming unanswered call information, the subscriber's incoming call busy information, the subscriber's outgoing unanswered call information, or the subscriber's outgoing busy call information. The SCP also creates a periodic report including at least some of the subscriber's call information.

A data collection server receives from the SCP, at periodic intervals, the periodic report, and makes at least some of the subscriber's call information available to a report distributor that distributes a distributed call report to a subscriber which includes at least some of the subscriber's call information.

A second embodiment of the invention relates to a method for providing a subscriber with an incoming call report, or an outgoing call report including call information associated with the subscriber, or both reports. The method includes receiving by a terminating end office a call from a user causing the terminating end office to trigger. The method further includes sending from the terminating end office an AIN query to an SCP in response to the trigger and creating a call record in the SCP including data related to at least one of incoming answered calls, incoming unanswered calls, incoming busy calls, outgoing unanswered calls, or outgoing busy calls. The method, moreover, includes transferring the call record to a periodic report in the SCP; and transferring from the SCP, at periodic intervals, the periodic report to the data collection server.

A third embodiment of the invention relates to a method for providing a subscriber with a report of incoming calls associated with the subscriber. The method includes receiving by a terminating end office an incoming call from a user causing the terminating end office to trigger, and sending from the terminating end office an AIN query to an SCP in response to the trigger. Moreover, the method includes creating a call record in the SCP related to the incoming call, including busy call or unanswered call information.

According to an aspect of the third embodiment, the method for providing the subscriber with the report of incoming calls associated with the subscriber may include creating the call record in the SCP to also include answered call information. Moreover, the method may further include sending from the terminating end office to the SCP a message when the call is terminated, and correlating the call record with the message. Furthermore, the method may additionally include populating the call record with answered information in the message; transferring the call record to a periodic report stored at the SCP; and transferring the periodic report to a data collection server.

According to another aspect of the third embodiment, the method for providing the subscriber with the report of incoming calls associated with the subscriber may include sending from the terminating end office to the SCP a message when the call is terminated. Moreover, the method may also include correlating the call record with the message, which includes call unanswered information, and populating the call record with information in the message. Furthermore, the method may also include transferring the call record to a periodic report stored at the SCP; and transferring the periodic report to a data collection server.

According to another aspect of the third embodiment invention, the method for providing a subscriber with a report of incoming calls associated with the subscriber may further include sending from the terminating end office to an originating end office an SS7 initial address message indicating that a called party device is busy. Moreover, the method may include sending a message to the SCP when the user terminates the call, and correlating the call record with the message, which includes called number busy information, and populating the call record with the called number busy information in the message. Still further, the method may also include transferring the call record to a periodic report stored at the SCP and transferring the periodic report to a data collection server.

A fourth embodiment of the present invention is a method that provides a subscriber with a report of outgoing calls associated with the subscriber. The method includes receiving by an originating end office a call from a caller causing the originating end office to trigger, and sending from the originating end office an AIN query to an SCP in response to the trigger. The method further creates a call record in the SCP related to the outgoing call including busy call or unanswered call information.

According to an aspect of the fourth embodiment, the method for providing a subscriber with a report of outgoing calls associated with the subscriber may further include creating the call record in the SCP to also include answered call information. Moreover, the method may include sending from the originating end office a message to the SCP and correlating the call record with the message. Still further, the method may additionally include populating the call record with answered information in the message; transferring the call record to a periodic report stored at the SCP; and transferring the periodic report to a data collection server.

According to another aspect of the fourth embodiment, the method for providing a subscriber with a report of outgoing calls associated with the subscriber may further include sending from the originating end office a message to the SCP and correlating the call record with the message that includes call went unanswered information. Moreover, the method may include populating the call record with call unanswered information in the message; transferring the call record to a periodic report stored at the SCP; and transferring the periodic report to a data collection server.

In another aspect of the fourth embodiment, the method for providing a subscriber with a report of outgoing calls associated with the subscriber may further include sending by the terminating end office to an originating end office an SS7 initial address message indicating that a recipient is busy, and sending a message to the SCP. Moreover, the method may include correlating the call record with the message and populating the call record with busy information in the message. Still further, the method may include transferring the call record to a periodic report stored at the SCP and transferring the periodic report to a data collection server.

A fifth embodiment of the present invention includes a computer readable medium storing a computer program that instructs a computing system to provide a subscriber with a report of incoming calls associated with the subscriber. When a terminating end office receives a call from a user, the program causes a terminating end office to trigger. The program, additionally, sends from the terminating end office an AIN query to an SCP in response to the trigger and creates a call record in the SCP related to the incoming call, including busy call or unanswered call information.

In an aspect of the fifth embodiment, the program may create the call record in the SCP to also include answered call information, and send a message from the terminating end office to the SCP when the call is terminated. The program may additionally include instructions correlating the call record with the message and populating the call record with answered information in the message. Moreover, the program may include instructions transferring the call record to a periodic report stored at the SCP and transferring the periodic report to a data collection server.

According to another aspect of the fifth embodiment, the program may include instructions to send a message from the terminating end office to the SCP when the call is terminated and to correlate the call record with the message, which includes call unanswered information. The program may additionally include instructions to populate the call record with information in the message; to transfer the call record to a periodic report stored at the SCP; and to transfer the periodic report to a data collection server.

According to another aspect of the fifth embodiment, the program may include instructions to send an SS7 initial address message, indicating that a called party device is busy, from the terminating end office to a originating end office. The program may additionally include instructions to send a message to the SCP when the user terminates the call and to correlate the call record with the message, which includes called number busy information. Still further, the program may include instructions to populate the call record with the called number busy information in the message; to transfer the call record to a periodic report stored at the SCP; and to transfer the periodic report to a data collection server.

According to a sixth embodiment of the present invention, a computer readable medium stores a computer program that instructs a computing system to provide a subscriber with a report of outgoing calls associated with the subscriber. When an originating end office receives a call from a caller, the program causes the originating end office to trigger and sends an AIN query from the originating end office to an SCP in response to the trigger. Moreover, the program including instructions to create a call record, including busy call or unanswered call information, in the SCP related to the outgoing call.

According to an aspect of the sixth embodiment, the program may include instructions to create the call record in the SCP to also include answered call information. The program may also include instructions to send a message from the originating end office to the SCP and to correlate the call record with the message. Moreover, the program may additionally include instruction to populate the call record with answered information in the message; to transfer the call record to a periodic report stored at the SCP; and to transfer the periodic report to a data collection server.

According to another aspect of the sixth embodiment, the program may include instructions to send a message from the originating end office to the SCP and to correlate the call record with the message, which includes call went unanswered information. Moreover, the program may also include instructions to populate the call record with call unanswered information in the message; to transfer the call record to a periodic report stored at the SCP; and to transfer the periodic report to a data collection server.

According to another aspect of the sixth embodiment, the program may include instructions to send an SS7 initial address message, indicating that a recipient is busy, from the terminating end office to an originating end office, and to send a message to the SCP. Moreover, the program may also include instructions to correlate the call record with the message, and to populate the call record with busy information in the message. Still further, the program may include instructions to transfer the call record to a periodic report stored at the SCP, and to transfer the periodic report to a data collection server.

The various aspects and embodiments of the present invention are described in detail below.

Call Report Management System

Figure 1:
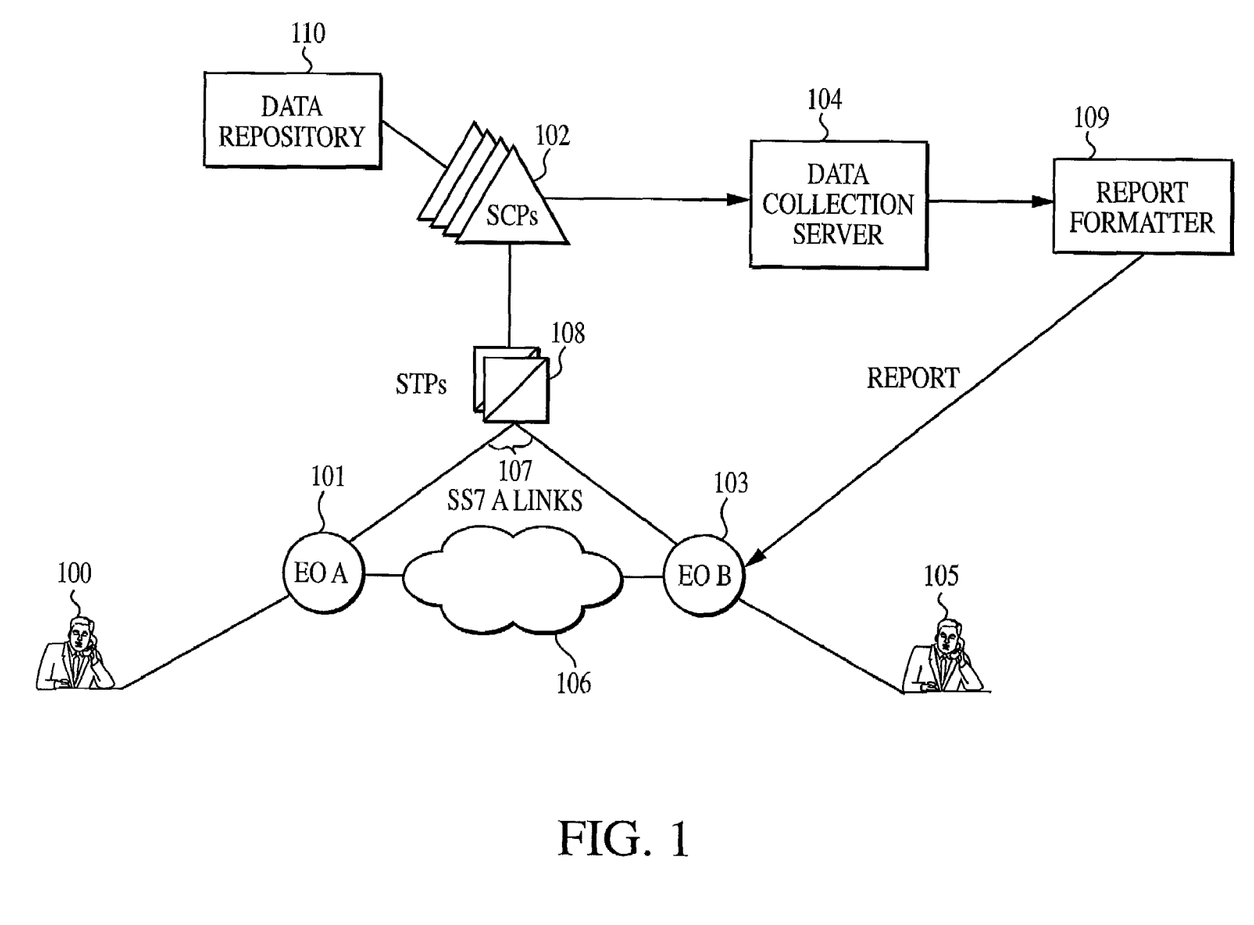
FIG. 1 is a system diagram showing an exemplary telecommunications network for generating call reports, according to an aspect of the present invention.

The present invention is an AIN based system and method that allows a subscriber connected to a communications network, including the Internet, to retrieve call reports including information regarding completed and not completed calls. FIG. 1 illustrates an exemplary telecommunications network in association with the present invention, for creating and storing report information. The system includes a call originating user device 100, an originating end office (EO) service switching point (SSP) 101, a terminating EO SSP 103 and a called user device 105. The network also includes a signaling transfer point (STP) 108, a service control point (SCP) 102, SS7 links 107, and a network to connect the EO SSPs 101 and 103. The system further includes a data collection server 104, report formatter 109, and data repository 110.

By way of example, the SCP 102 is implemented with the Telecordia Integrated Service Control Point, loaded with ISCP software Version 4.4 (or higher), available from Telecordia, Murray Hill, N.J. In an alternative embodiment of the invention, the SCP 102 may be a Lucent Advantage SCP, with software release 94, available from Lucent Technologies, Inc. The SCP is enabled to process telephone calls, but can also be configured to process FAX, Central Office Exchange Service (CENTREX), Direct Inward Dial (DID), Direct Outward Dial (DOD), and "800" services.

The terminating EO 103 is an SSP for the called user 105 and the originating EO 101 is an SSP for the originating user 100. However, the terminating EO and the originating EO may be the same. The EOs 101 and 103 may include, for example, SESS switches with a minimum switch generic of 5E14 manufactured by Lucent Technologies, Inc.; DMS-100 switches with a minimum switch generic of NA015 manufactured by Nortel Networks Corporation (Nortel); or EWSD switches with a minimum switch generic of Release 17 with patch set 170 and Release 18 with patch set 29 available from Siemens Information and Communication Networks, Inc. The switches may utilize an AIN Release 0.1 protocol.

The call service logic of the present invention may be upgraded to accommodate future AIN releases and protocols and future trigger types. Specifications of AIN Release 0.1 SSPs may be found in Telecordia GR-1299-CORE, AIN 0.1 Switch-Service Control Point Application Protocol Interface Generic Requirements, and Telecordia GR-1298-CORE, AIN 0.1 Switching Systems Generic Requirements, the disclosures of which are expressly incorporated by reference herein in their entireties.

The user devices 100 and 105 of the present invention may be standard telephones. These devices may also be special devices used when communicating over fax, CENTREX, DID, or DOD systems, or any other device used to communicate over a telecommunication system.

The data collection server 104 collects reports from the SCP memory and makes it available to the report formatter 109. The delivery of reports to the report formatter 109 can be a push or pull process. Where push technology is used, the data collection server 104 also has the ability to respond to requests from the report formatter 109 to send a report that the report formatter 109 may not have received. The data collection server 104 may be implemented in the SCP or in a stand alone system such as a SUN Enterprise 450 server using a Solaris 8.0 operating system.

The report formatter 109 generates call reports for subscribers. These reports can be of various forms such as paper, web page, e-mail, audio, or any other communications means used in the presentation of information. The report formatter 109 may be implemented using a Dell Inc. 4300 computer system, with a LINUX operating system and with code written in Java.

The data repository 110 is an optional system that contains information about a subscriber and may have a capability to obtain additional information from other sources, e.g. other databases, Internet, etc., about both the subscriber and the connecting party. The information could include zip code; vertical and horizontal coordinate information; group information such as CENTREX group information and organizational information; profiling information such as patient medication used and special needs of a patient, etc. The information provided by the data repository 110 is transferred to the SCP for incorporation into a call record for a particular call. The data repository may be implemented with a database that may reside locally or be accessed remotely through a network connection, e.g., a LAN, WAN, or SS7 network.

Data Collection

Figure 2:
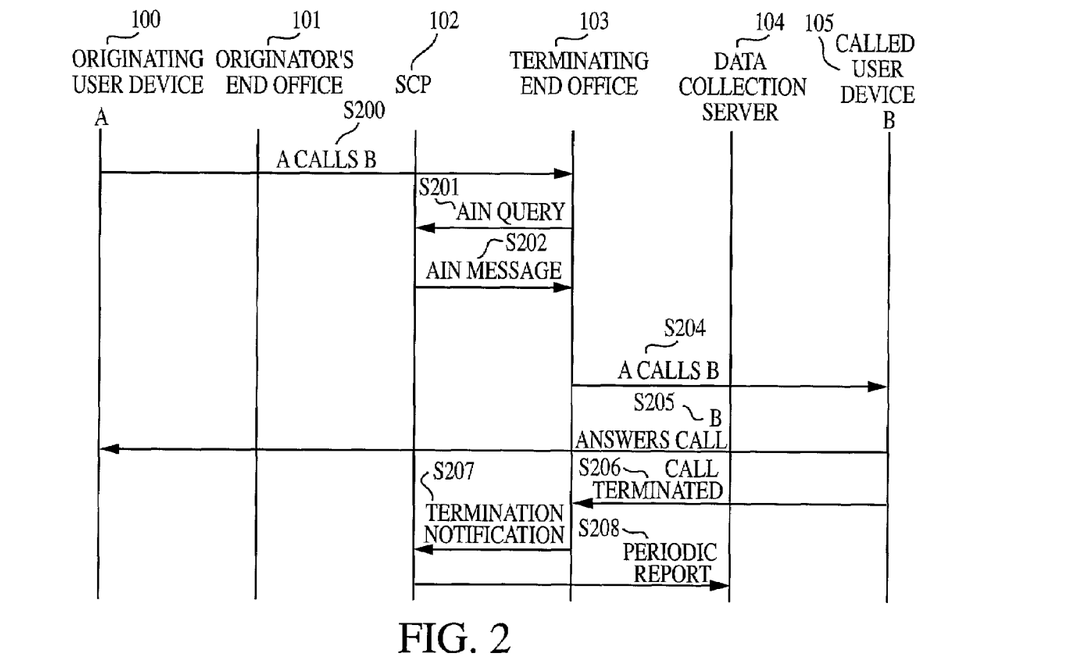
FIG. 2 is an exemplary call flow diagram in which a call to a called subscribing user is answered, according to an aspect of the present invention.

An embodiment of the present invention is shown in FIG. 2. FIG. 2 is a call flow diagram showing a completed call to a subscribing user's device 105. In this embodiment, an originating caller uses an originating user device A 100 and places a call, step S200, to a subscribing user's device B 105. The call triggers in the terminating EO 103, sending an AIN query to the call management reports (CMR) service logic of the SCP 102 at step S201. Exemplary triggers for incoming calls include a Specific Digit String (SDS) trigger or Terminating Attempt Trigger (TAT) trigger. An AIN message, such as a send notification response with an authorized termination message in response to a TAT trigger or a continue message in response to a SDS trigger, is sent from the SCP 102 to the terminating EO 103 at step S202. A record is created in the SCP 102 and stored for later use. If the subscriber subscribes to a calling name delivery (CNAM) service, the CMR logic looks at the display text information associated with CNAM and includes the caller's name in the record.

The call between the originating user device 100 and the subscribing called user's device 105 connects at step S204, is answered at step S205, and terminates at step S206. Either the originating user device 100 or subscribing called user device 105 can terminate the call at step 206. The terminating EO 103 sends another AIN message, e.g. a termination notification message, to the SCP 102 at step S207. The echo data functionality, such as the subscriber's telephone number, of the AIN message is used to correlate the message with the call record created previously. The record is then populated with the AIN message information and passed to the current report on the SCP 102 disk as at step S207 in the termination notification. The report may include information for a period (e.g., ½ hour), thus, making it a periodic report. When the report is closed, the SCP 102 transfers the report, possibly compressed, to the data collection server 104, using, for example, FTP, at step S208. The SCP logic is further described in FIGS. 8 and 9.

Figure 3:
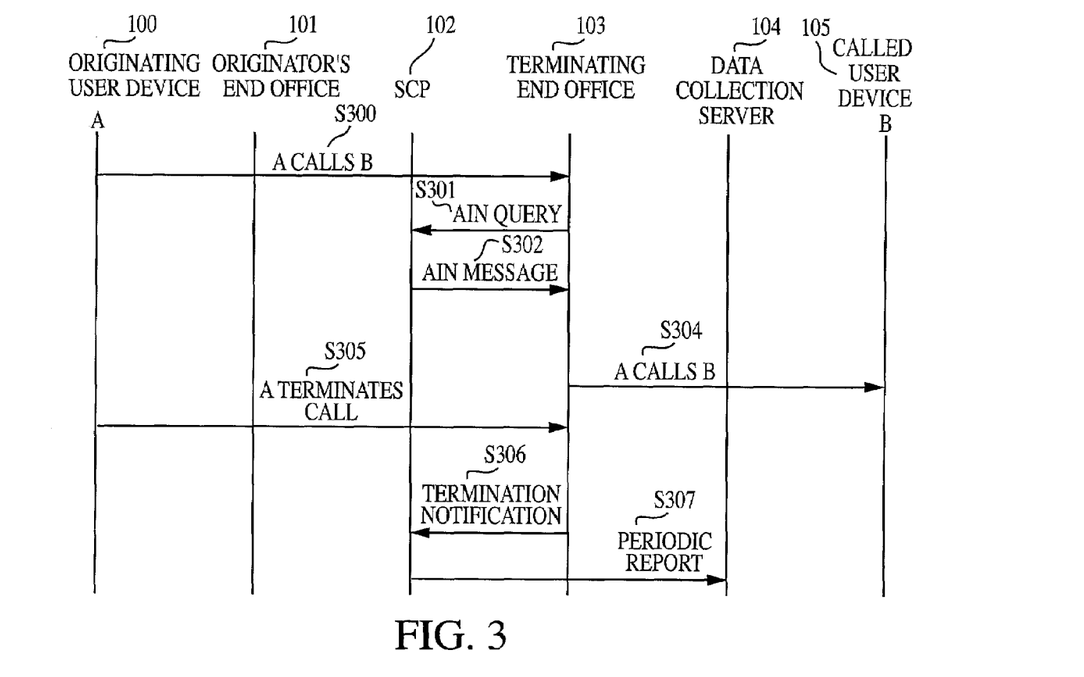
FIG. 3 is an exemplary call flow diagram in which a call to a called subscribing user is unanswered, according to an aspect of the present invention.

Another embodiment of the present invention is shown in FIG. 3. FIG. 3 is a call flow diagram showing a call to a subscribing user's device 105 that is unanswered. In this embodiment, an originating caller uses an originating user device A 100 and places a call, step S300, to a subscribing user's device B 105. The call triggers in the terminating EO 103, sending an AIN query to the call management reports (CMR) service logic of the SCP 102 at step S301. Exemplary triggers for incoming calls include a Specific Digit String (SDS) or Terminating Attempt Trigger (TAT) trigger. An AIN message, such as a send notification response with an authorized termination message in response to a TAT trigger or a continue message in response to a SDS trigger, is sent from the SCP 102 to the terminating EO 103 at step S302. A record is created in the SCP 102 and stored for later use. If the subscriber subscribes to a calling name delivery (CNAM) service, the CMR logic looks at the display text information associated with CNAM and includes the caller's name in the record.

After the call between the originating user device 100 and the subscribing called user's device 105 connects at step S304, is unanswered, and is terminated at step S305 by the originating user's device 100, the terminating EO 103 sends another AIN message, e.g. a termination notification message, to the SCP 102 at step S207. The echo data functionality of the AIN message, e.g. the subscriber's telephone number, is used to correlate the message with the call record created previously. The AIN message includes information that notifies the CMR logic that the call went unanswered. The record is then populated with the AIN message information and passed to the current report, on the SCP 102 at step S306. The report may be periodic. When the report is closed, the SCP 102 transfers the report, possibly compressed, to the data collection server 104, using, for example, FTP, at step S307. The SCP logic is further described in FIGS. 8 and 9.

Figure 4:
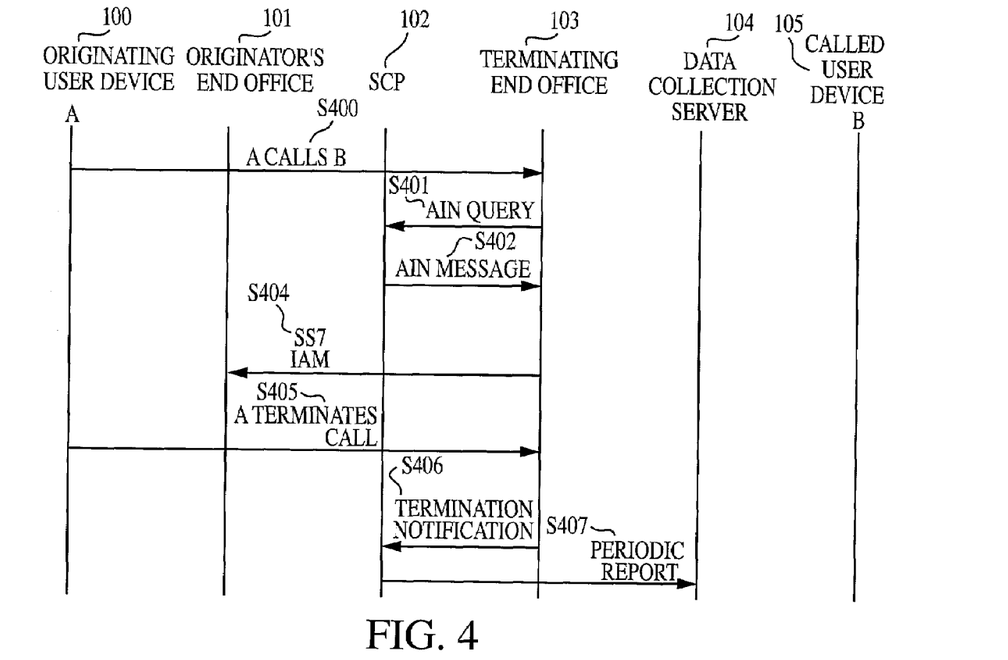
FIG. 4 is an exemplary call flow diagram in which a call to a called subscribing user is busy, according to an aspect of the present invention.

A further embodiment of the present invention is shown in FIG. 4. FIG. 4 is a call flow diagram showing a call to a subscribing user's device 105 that is busy. In this embodiment, an originating caller uses an originating user device A 100 and places a call to a subscribing user's device B 105 at step S400. The call triggers in the terminating EO 103 sending an AIN query to the CMR service logic of the SCP 102 at step S401. Exemplary terminating triggers for incoming calls could be either SDS triggers or TAT triggers. An AIN message, for example a send notification response including a TAT trigger or a continue message in response to a SDS trigger, is sent from the SCP to the terminating EO 103 at step S402. A record is created in the SCP 102 and stored for later use. If the subscriber subscribes to a CNAM service, the CMR logic looks at the display text information associated with CNAM and includes the caller's name in the record.

If the subscribing called user device 105 is busy, as is well known in the art, the terminating EO 103 sends an SS7 Initial Address Message (IAM) with cause indicator of user busy to the originator's EO 101 at step S404 to let the originating caller know the line is busy. In step S404, the busy indicator may also be generated and sent by any other network device between the originator's EO 101 and the terminating EO 103 to indicate that the call cannot be completed. When the originating user's device 100 terminates the call at step S405, the terminating EO 103 sends an AIN message, e.g. a termination notification message to the SCP 102, at step S406. The echo data functionality of the AIN message such as the subscriber's phone number is used to correlate the message with the call record created. The AIN message includes information that notifies the CMR logic that the subscribing called user device 105 was busy. The record is then populated with the AIN message information and passed to the current report, on the SCP 102. The report may be periodic. When the report is closed, the SCP 102 transfers the report, possibly compressed, to the data collection server 104, using, for example, FTP, at step S407. The SCP logic is further described in FIGS. 8 and 9.

Figure 5:
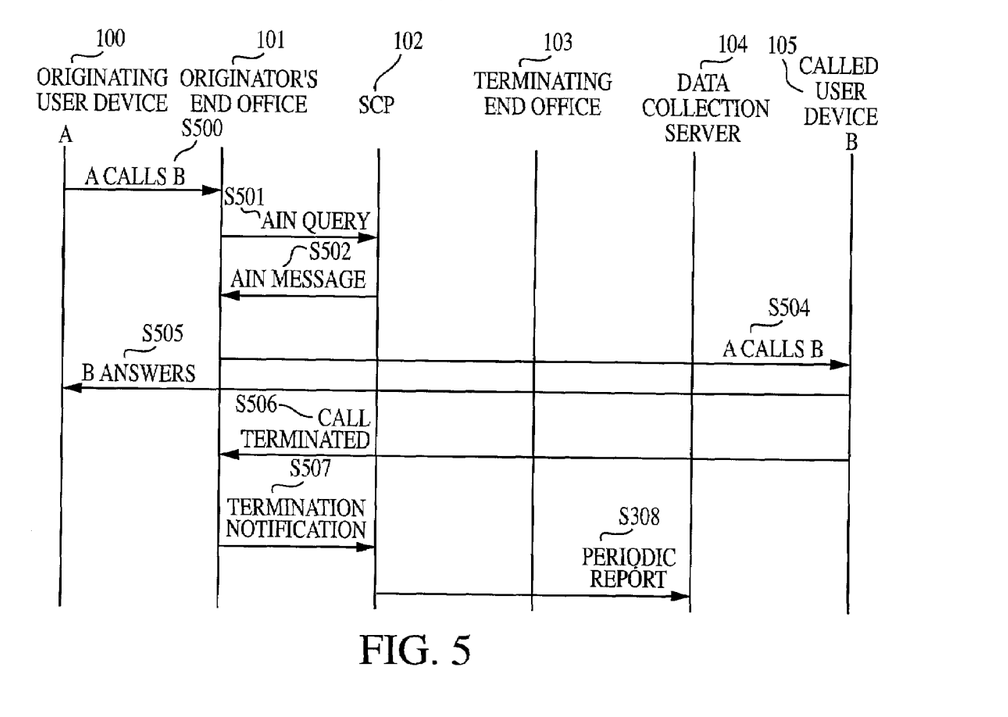
FIG. 5 is an exemplary call flow diagram in which a call from a subscriber to a called user is answered, according to an aspect of the present invention.

Another embodiment of the present invention is shown in FIG. 5. FIG. 5 is a call flow diagram showing an answered call from a subscriber's originating device A 100 to a called user device B 105. In this embodiment, a subscriber's originating user device A 100 places a call to a called user's device B 105 at step S500. The call triggers in the originator's EO 100 sending an AIN query to the CMR service logic of the SCP 102 at step S501. Exemplary triggers for outgoing calls could be either a customized dialing plan (CDP) or Off Hook Delay (OHD) trigger. An AIN message, e.g. send notification with an analyze route message in response to either the CDP trigger or OHD trigger, is sent from the SCP to the originator's EO 101 at step S502. A record is created in the SCP 102 and stored for later use.

The subscribing originating user device 100 connects with the called user's device 105 at step S504, the called user device 105 is answered at step S505, and the call is terminated by either A's device 100 or B's device 105 at step S506. The originator's EO 101 sends an AIN message, such as a termination notification message, to the SCP 102 at step S507. The echo data functionality of the AIN message, e.g. the subscriber's phone number, is used to correlate the AIN message information with the call record created. The record is then populated with the AIN message information and passed to the current report on the SCP 102. The report may be periodic. When the report is closed, the SCP 102 transfers the report, possibly compressed, to the data collection server 104, using, for example, FTP, at step S508. The SCP logic is further described in FIGS. 8 and 9.

Figure 6:
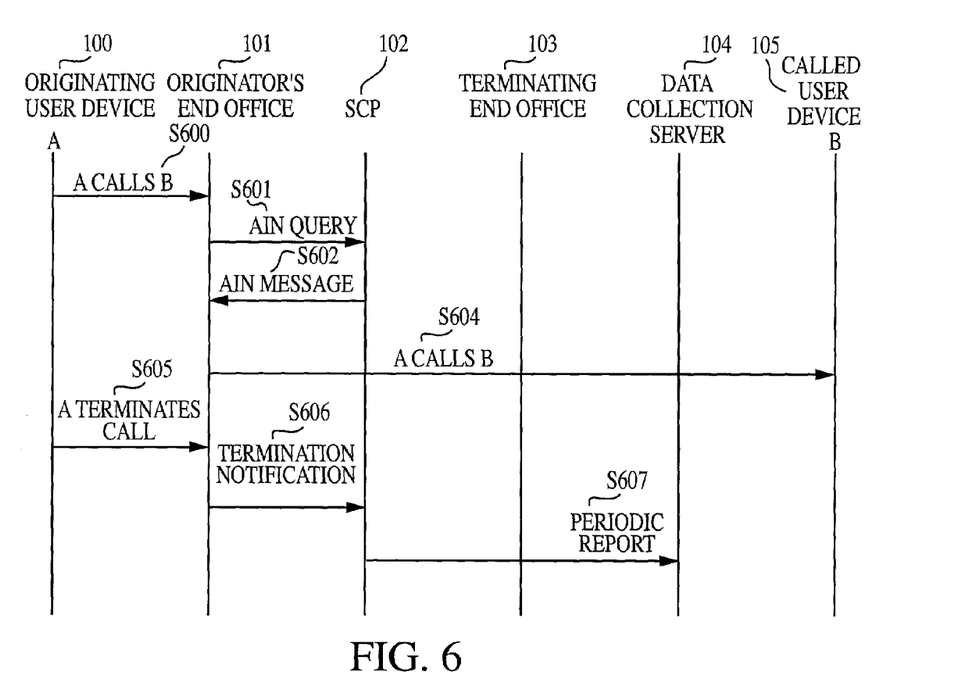
FIG. 6 is an exemplary call flow diagram in which a call from a subscriber to a called user is unanswered, according to an aspect of the present invention.

A further embodiment of the present invention is shown in FIG. 6. FIG. 6 is a call flow diagram showing an unanswered call from a subscribing originating user's device A 100 to a called user device B 105. In this embodiment, a subscriber's originating user device A 100 places a call to a called user's device B 105 at step S600. The call triggers in the originator's EO 100 sending an AIN query to the CMR service logic of the SCP 102 at step S601. Exemplary triggers for outgoing calls could be either a customized dialing plan (CDP) or Off Hook Delay (OHD) trigger. An AIN message, e.g. send notification with an analyze route message in response to either the CDP trigger or OHD trigger, is sent from the SCP to the originator's EO 101 at step S602. A record is created in the SCP 102 and stored for later use.

After the subscribing originating user device 100 connects with the called user's device 105 at step S604, the called party does not answer, and the subscribing originating user's device 100 terminates the call at step S605, the originator's EO 101 sends an AIN message, such as a termination notification message, to the SCP 102 at step S606. The echo data functionality of the AIN message, e.g. the subscriber's telephone number, is used to correlate the message with the call record created. The AIN message includes information that notifies the CMR logic of the SCP 102 that the call went unanswered. The record is then populated with the AIN message information and passed to the current report, on the SCP 102. The report may be periodic. When the report is closed, the SCP 102 transfers the report, possibly compressed, to the data collection server 104, using, for example, FTP, at step S607. The SCP logic is further described in FIGS. 8 and 9.

Figure 7:
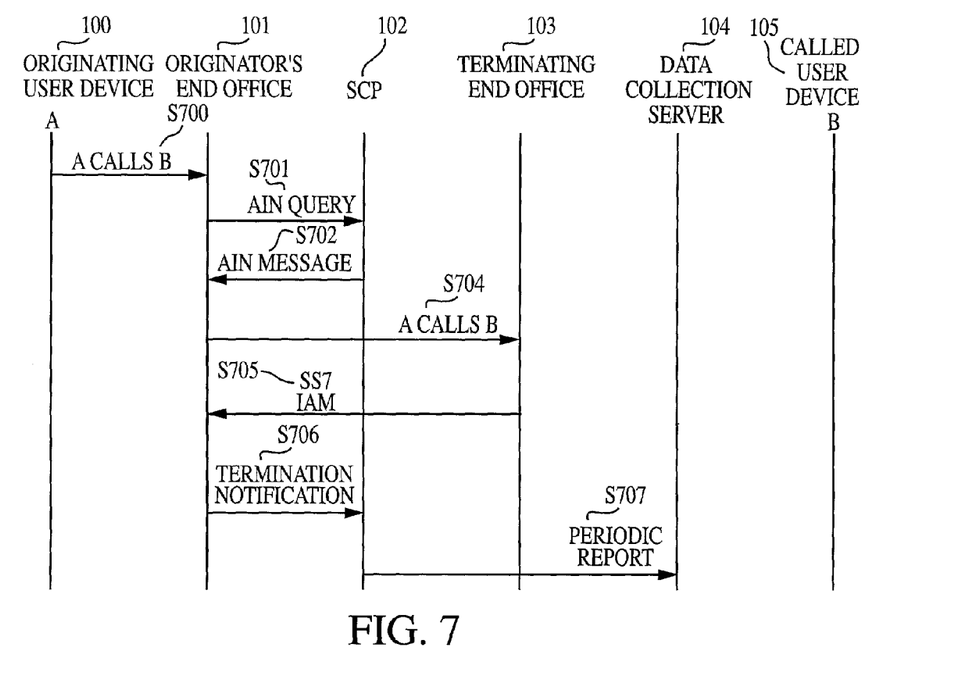
FIG. 7 is an exemplary call flow diagram in which a call from a subscriber to a called user is busy, according to an aspect of the present invention.

A further embodiment of the present invention is shown in FIG. 7. FIG. 7 is a call flow diagram showing a call from a subscribing originating user device 100 to a called user device 105 that is busy. In this embodiment, a subscriber's originating user device A 100 places a call to a called user's device B 105 at step S700. The call triggers in the originator's EO 100 sending an AIN query to the CMR service logic of the SCP 102 at step S701. Exemplary triggers for outgoing calls could be either a customized dialing plan (CDP) or Off Hook Delay (OHD) trigger. An AIN message, e.g. send notification with an analyze route message in response to either the CDP trigger or OHD trigger, is sent from the SCP to the originator's EO 101 at step S702. A record is created in the SCP 102 and stored for later use.

After the subscribing originating user device 100 connects with the terminating EO 103 at step S704 and the called user device 105 is busy, as is well known in the art, the terminating EO 103 sends an SS7 IAM with cause indicator of user busy to the originator's EO 101 at step S705 to let the originating caller know the line is busy. In Step 704, the busy indicator may also be generated and sent by any other network device between the originator's EO 101 and the terminating EO 103 to indicate that the call cannot be completed. The originating EO 103 then sends an AIN message, such as a termination notification message, to the SCP 102 at step S706. The echo data functionality of the AIN message, e.g. the subscriber's telephone number, is used to correlate the AIN message with the call record created. The AIN message includes information that notifies the CMR logic of the SCP 102 that the called user device 105 was busy. The record is then populated with the AIN message information and passed to the current report, on the SCP 102. The report may be periodic. When the report is closed, the SCP 102 transfers the report, possibly compressed, to the data collection server 104, using, for example, FTP, at step S707. The SCP logic is further described in FIGS. 8 and 9.

SCP CMR Logic

Figure 8:
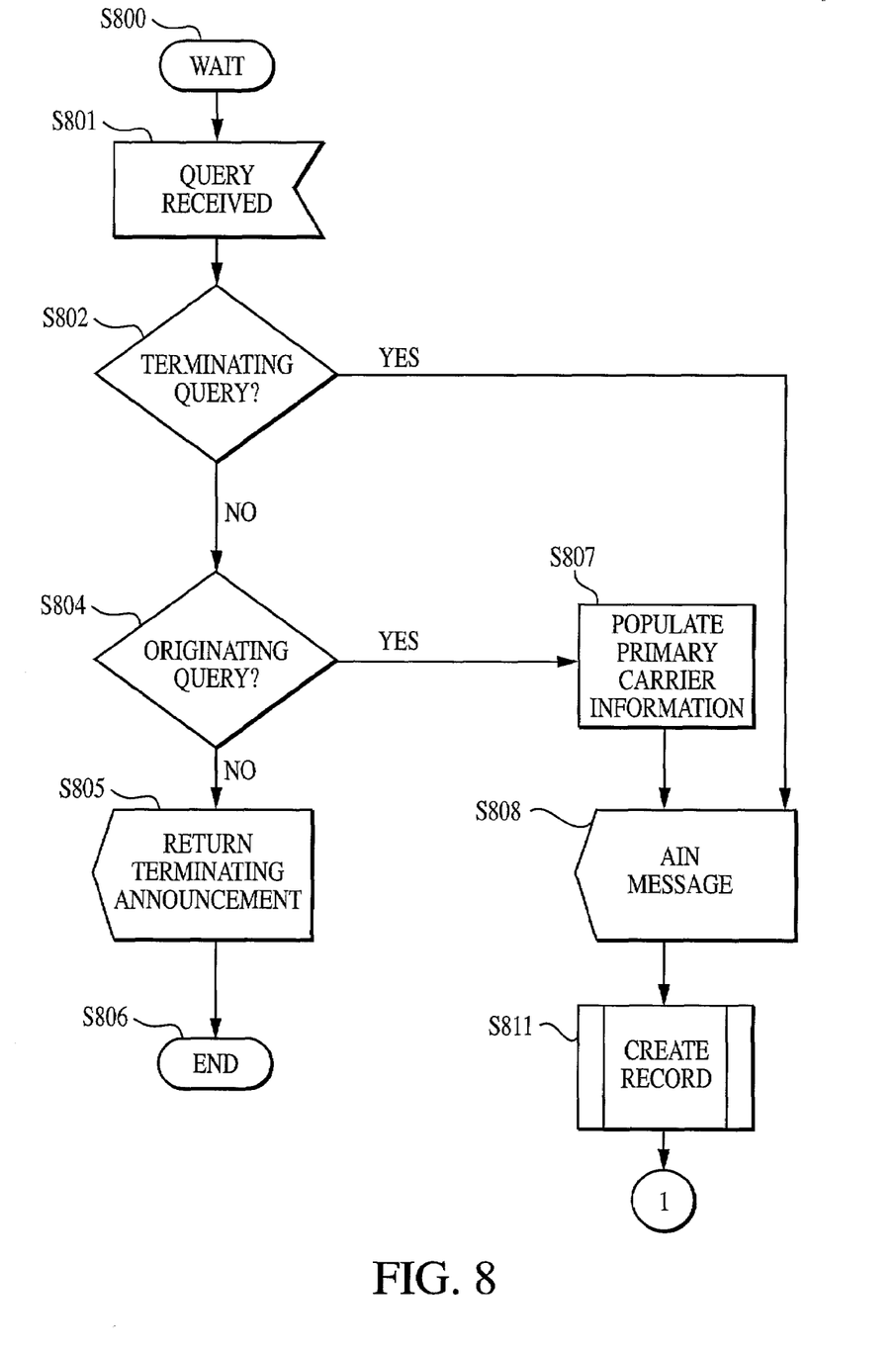
FIG. 8 is an exemplary flow diagram showing how a service control point processes an AIN query generated by a trigger, according to an aspect of the present invention.

FIG. 8 shows an exemplary view of how the CMR system logic of the SCP 102 creates a call record. At step S800, the SCP 102 waits for a AIN triggered query. When a query is received at step S801, the SCP 102 determines what kind of triggered query was received at step S802. If the SCP 102, at step S802, determines that the query is a terminating query, such as TAT triggered query or SDS triggered query, then an AIN message, such as a send notification including a continue message or authorized termination message is returned at step S808 to the EO that launched the terminating query and a record is created in step S811. If the SCP 102 determines that the query is not a terminating query at step S802, then the SCP determines at step S804 if an originating query, such as an OHD triggered query or CDP triggered query, has been received. If at step S804 the SCP determines that an originating query has been received, then primary carrier information, including the carrier of the subscribing caller, is populated at step S807 and an AIN message, such as a send notification with an analyze route message, is returned at step S808 to the EO that launched the originating query and a record is created at step 811. If at step S804 the SCP 102 determines that the query received at step S801 is not an originating query, then a terminating announcement is returned to the EO that sent the query at step S805 and the process ends for that particular call at step S806. After an AIN message is sent from the SCP 102 to the EO at step S808, a call record is created at the SCP 102 for the call being processed. Additional information may be added to the call record at this time from the data repository 110.

Figure 9:
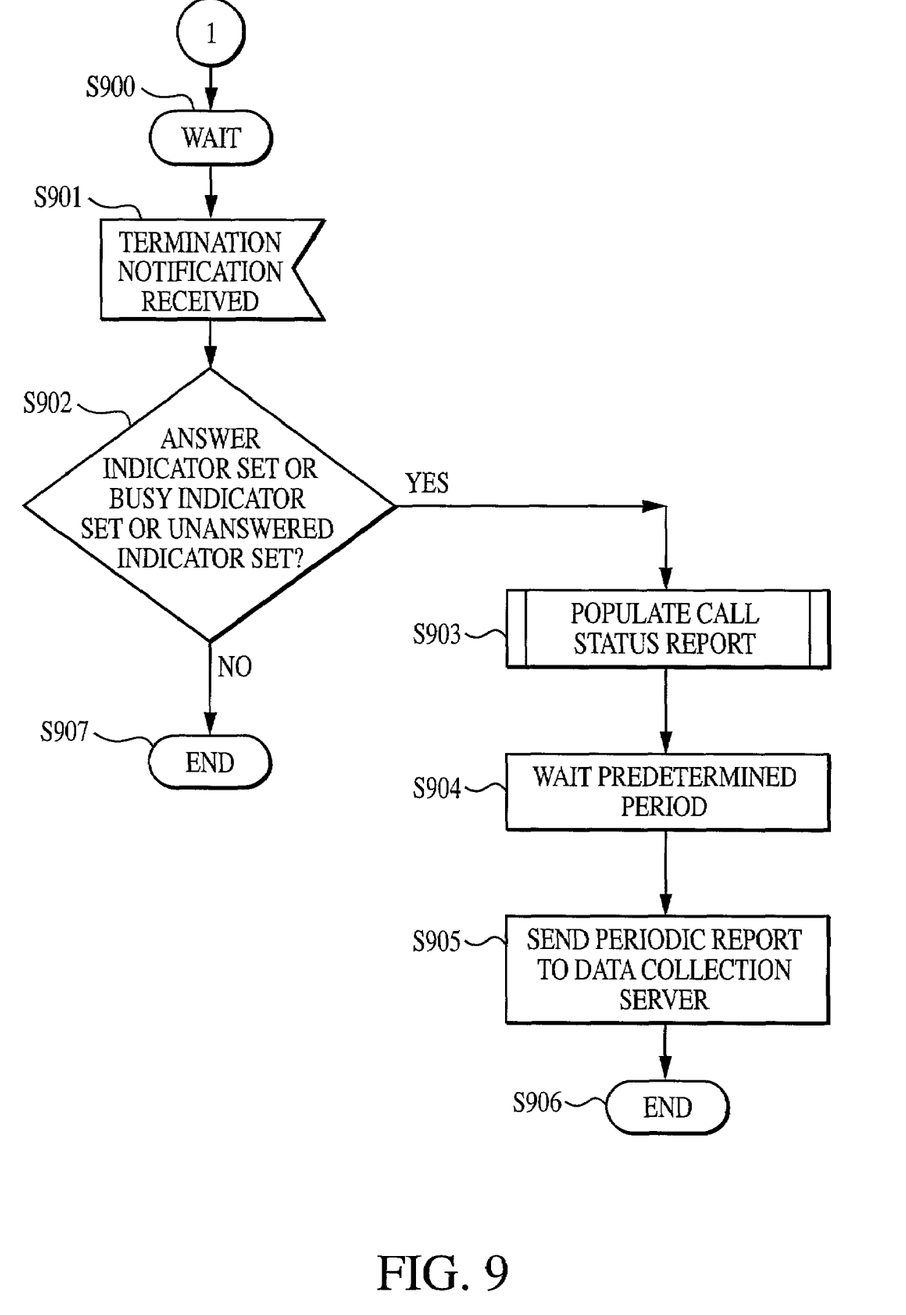
FIG. 9 is an exemplary flow diagram showing how a service control point prepares and stores a report, according to an aspect of the present invention.

After a record is created at step S811, the process continues to a wait state at step S900, as shown in FIG. 9. FIG. 9 shows an exemplary view of how the CMR system logic of the SCP 102 prepares a report for the data collection server 104. The SCP 102 waits for an AIN message such as a termination notification at step S901 which includes information about the status of the call. A termination notification is received at step S901 and the SCP 102 determines what kind of termination notification it has received. If the termination notification includes indicator information that a call was answered, the called device was busy, or a call went unanswered, then a call report is populated with call related information at step S903. The call report is populated with individual call records once they have been completed for each call.

After waiting a pre-determined period of time at step S904, the SCP 102 transfers the periodic report to the data collection server 104 at step S905 and the process ends at S906. The predetermined time period can be any period of time, however, smaller periods allow for near real time report information to be made available. If, at step S902, the termination notification does not include indicator information that a call was answered, a busy signal was received, or a call went unanswered, then the process ends without populating the call report at step S907.

Messages

At step S808 where an AIN message is sent by the SCP 102 and step S901 where AIN message is received by the SCP 102, notification information is transferred. The notification information is discussed below.

In step S808, an analyze route message may be sent if an originating query is received in step S804. The analyze route message includes route index information, caller and called number information, and a time stamp. In step S808, a continue message or authorization termination announcement message is transferred, if a terminating query is received in step S802. A continue message includes information to pass the call through to the desired party without higher level services, caller and called number information, and a time stamp. A termination announcement message includes terminating information, caller and called number information, and a time stamp.

In step S901 a termination notification is received by the SCP 102. The termination notification includes call status information, e.g., answered, busy, or unanswered, time stamp information, and caller and called number information.

Reports

Figure 10:
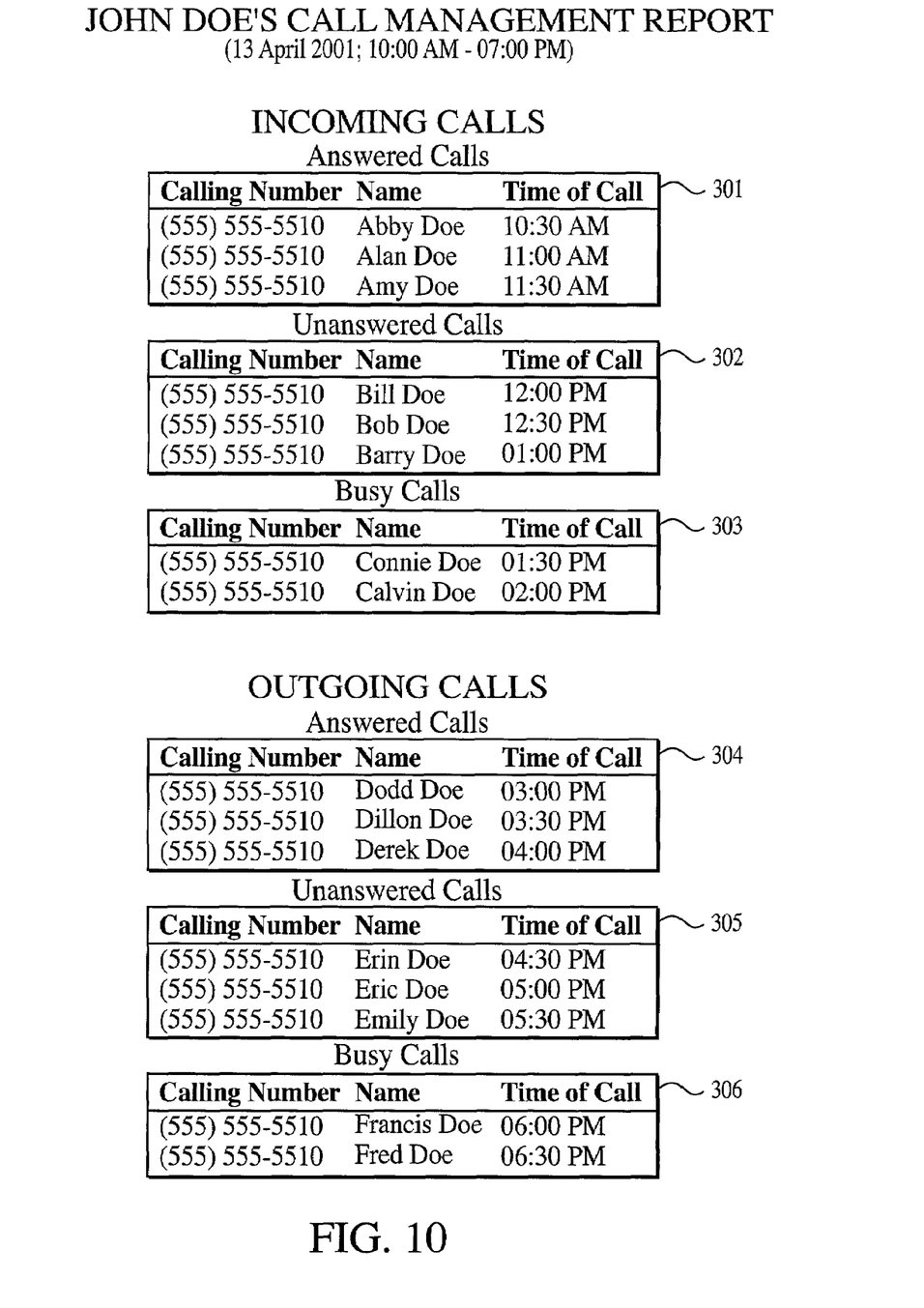
FIG. 10 is an exemplary report that a report formatter may provide to a user, according to an aspect of the present invention.

FIG. 10 is an exemplary report that a report formatter may make available to a user, according to an aspect of the present invention. In this report, the report formatter 109 may assemble for a subscriber answered call information 301, unanswered call information 302, and busy call information 303 for a subscriber's incoming calls for a period of eight hours. Moreover, the report formatter 109 may assemble for a subscriber answered call information 304, unanswered call information 305, and busy call information 306 for a subscriber's outgoing calls for the same period.

However, the reports that a report formatter 109 may generate for a subscriber are not limited to those shown in FIG. 10. Reports may be generated including call status information by hour, day of week, day of month, week, and month. Moreover, reports may be generated on all calls, answered calls, busy calls, unanswered calls, unknown calls, and average daily calls. Further, a report may include call information regarding top zip codes and new zip codes of call participants; where a top zip code could be the zip code most called to or from. A report of all top callers, answered top callers, busy top callers, unanswered top callers, and new callers may also be provided; where top callers could be the callers that call the most. The report formatter 109 may also include in a report information on total call duration, average call duration, call duration distribution, and top caller duration. The report may also include trend information including a weekly call analysis, monthly call analysis, weekly call trend, monthly call trend, and average monthly call trend. The report may, additionally, include multiple group reports such as detail call status by group, summary call status by group, total calls by hour and group, total call duration by group, average call duration by group, and average daily calls by group.

Moreover, the reports a report formatter 109 may generate, could include information that is refreshed with new information in periodic increments, e.g., every thirty minutes or less. This allows a subscriber to obtain call report information in a period similar to real time. The report formatter may also provide the information to a subscriber in an ASCII file or possible over the Internet via a web page.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

What is claimed is:

1. A method for providing a call report for incoming calls and outgoing calls, comprising:
   receiving queries from an end office that generates the queries when the end office is triggered, each query relating to one of a send notification for an outgoing call or a termination notification for an incoming call;
   creating call records including data related to the incoming and outgoing calls;
   transferring the call records to a periodic report; and
   transferring the periodic report to a data collection server at periodic intervals.

2. The method of claim 1, wherein the termination notification comprises one of a terminating attempt trigger (TAT) and a specific digit string (SDS) trigger.

3. The method of claim 2, wherein the end office sends an SS7 initial address message to an originating end office indicating that a called party device is busy.

4. The method of claim 3, further comprising:
   receiving the termination notification which includes busy information when the call is terminated;
   correlating the call record with the termination notification; and
   populating the call record with the called number busy information.

5. The method of claim 1, wherein the sending notification comprises one of an off hook delay (OHD) trigger and a customized dialing plan (CDP) trigger.

6. The method of claim 1, wherein the call records are created in a service control point, and wherein the data related to the incoming and outgoing calls comprises data relating to incoming answered calls, incoming unanswered calls, incoming busy calls, outgoing answered calls, outgoing unanswered calls and outgoing busy calls.

7. The method of claim 1, further comprising:
   receiving the termination notification which includes answered call information from the end office when a call is terminated;
   correlating the call record with the termination notification; and
   populating the call record with the answered call information,
   wherein the call records are created in a service control point.

8. The method of claim 1, further comprising:
   receiving the termination notification which includes unanswered information from the end office when a call is terminated;
   correlating the call record with the termination notification; and
   populating the call record with the unanswered information,
   wherein the call records are created in a service control point.

9. A computer readable medium storing a computer program that instructs a computing system to provide a call report for incoming calls and outgoing calls, comprising:
   a query receiving code segment that receives queries from an end office that generates the queries when the end office is triggered, each query relating to one of a send notification for an outgoing call or a termination notification for an incoming call;
   a record creating code segment that creates call records including data related to the incoming and outgoing calls;
   a record transferring code segment that transfers the call records to a periodic report; and
   a report transferring code segment that transfers the periodic report to a data collection server at periodic intervals.

10. The computer readable medium of claim 9, wherein the the termination notification comprises one of a terminating attempt trigger (TAT) and a specific digit string (SDS) trigger.

11. The computer readable medium of claim 10, wherein the end office sends an SS7 initial address message to an originating end office indicating that a called party device is busy.

12. The computer readable medium of claim 11, further comprising:
- a message receiving code segment that receives the termination notification includes busy information when the call is terminated;
- a call record correlating code segment that correlates the call record with the termination notification message; and
- a call record populating code segment that populates the call record with called number busy information in the termination notification message.

13. The computer readable medium of claim 9, wherein the sending notification comprises one of an off hook delay (OHD) trigger and a customized dialing plan (CDP) trigger.

14. The computer readable medium of claim 9, wherein the call records are created in a service control point, and wherein the data related to the incoming and outgoing calls comprises data relating to incoming answered calls, incoming unanswered calls, incoming busy calls, outgoing answered calls, outgoing unanswered calls and outgoing busy calls.

15. The computer readable medium of claim 9, further comprising:
- a message receiving code segment that receives the termination notification which includes answered call information from the end office when a call is terminated;
- a call correlating code segment that correlates the call record with the termination notification; and
- a call record populating code segment that populates the call record with the answered call information in the termination notification, wherein the call records are created in a service control point.

16. The computer readable medium of claim 9, further comprising:
- a message receiving code segment that receives the termination notification which includes unanswered information from the terminating end office when a call is terminated;
- a call correlating code segment that correlates the call record with the termination notification; and
- a call record populating code segment that correlates the call record with the unanswered information in the termination notification, wherein the call records are created in a service control point.

17. A system comprising;
a service control point that collects subscriber call information from queries based on AIN triggers from at least one switch for incoming calls and outgoing calls, and that creates a periodic report including the collected call information, said service control point transferring the periodic report to a data collection server at periodic intervals, said data collection server making the collected call information available to a report distributor that distributes a distributed call report which includes the collected call information.

18. A system comprising:
a data collection server that receives a periodic report at periodic intervals from a service control point that collects subscriber call information from queries based on AIN triggers from at least one switch for incoming calls and outgoing calls, the service control point creating the periodic report including the collected call information, said data collection server making the collected call information available to a report distributor that distributes a distributed call report which includes the collected call information.

* * * * *

UNITED STATES PATENT AND TRADEMARK OFFICE
CERTIFICATE OF CORRECTION

| | |
|---|---|
| PATENT NO. | : 7,366,292 B2 |
| APPLICATION NO. | : 09/985244 |
| DATED | : April 29, 2008 |
| INVENTOR(S) | : Dianna Inara Tiliks et al. |

It is certified that error appears in the above-identified patent and that said Letters Patent is hereby corrected as shown below:

In column 15 line 12 of the printed patent, after "notification" insert --which--

Signed and Sealed this

Eighteenth Day of November, 2008

JON W. DUDAS
*Director of the United States Patent and Trademark Office*